US012088426B2

(12) United States Patent
Sundararajan et al.

(10) Patent No.: US 12,088,426 B2
(45) Date of Patent: Sep. 10, 2024

(54) AUTOMATING A SOFTWARE-DEFINED WIDE AREA NETWORK POLICY FOR INTERNET OF THINGS END POINTS

(71) Applicant: Cisco Technology, Inc., San Jose, CA (US)

(72) Inventors: Balaji Sundararajan, Fremont, CA (US); Vivek Agarwal, Campbell, CA (US); Anand Oswal, Pleasanton, CA (US); Chethan Channappa, San Jose, CA (US); Subhash Kodnad, Dublin, CA (US); Jeevan Sharma, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/882,752

(22) Filed: Aug. 8, 2022

(65) Prior Publication Data

US 2022/0376982 A1    Nov. 24, 2022

Related U.S. Application Data

(63) Continuation of application No. 16/739,442, filed on Jan. 10, 2020, now Pat. No. 11,411,765.

(51) Int. Cl.
*H04L 12/28*    (2006.01)
*G06F 9/455*    (2018.01)
(Continued)

(52) U.S. Cl.
CPC ...... *H04L 12/2856* (2013.01); *G06F 9/45558* (2013.01); *G16Y 30/10* (2020.01);
(Continued)

(58) Field of Classification Search
CPC . H04L 12/2854; H04L 12/2856; H04L 12/66; H04L 41/0893; H04L 41/0894;
(Continued)

(56) References Cited

U.S. PATENT DOCUMENTS 9,179,007 B1 * 11/2015 Yadav ................. H04L 41/0893
9,979,606 B2 * 5/2018 Gupta ................. H04W 12/121
(Continued)

FOREIGN PATENT DOCUMENTS

CN        1842058 A    10/2006
CN    109076028 A    12/2018
(Continued)

OTHER PUBLICATIONS

Miettinen, Markus, et al. "Iot sentinel: Automated device-type identification for security enforcement in iot." 2017 IEEE 37th International Conference on Distributed Computing Systems (ICDCS). IEEE. (Year: 2017).*

(Continued)

*Primary Examiner* — John M MacIlwinen
(74) *Attorney, Agent, or Firm* — Baker Botts L.L.P.

(57) ABSTRACT

The present disclosure is directed to managing industrial internet of things end points and includes one or more processors and one or more computer-readable non-transitory storage media coupled to the one or more processors and comprising instructions that, when executed by the one or more processors, cause one or more switches to perform operations comprising: identifying a first end point using a protocol associated with the first end point, determining a classification for the identified first end point based on one or more attributes of the first end point, identifying one or more related end points having the classification in common with the first end point, segmenting the first end point with the identified one or more related end points, and applying
(Continued)

one or more policies to the segmented first end point and the one or more related end points.

18 Claims, 5 Drawing Sheets

(51) Int. Cl.
| | |
|---|---|
| *G16Y 30/10* | (2020.01) |
| *H04L 9/40* | (2022.01) |
| *H04L 12/66* | (2006.01) |
| *H04L 41/0894* | (2022.01) |
| *H04L 41/14* | (2022.01) |
| *H04L 41/50* | (2022.01) |
| *H04L 47/76* | (2022.01) |
| *H04L 49/00* | (2022.01) |
| *H04L 67/12* | (2022.01) |
| *H04W 92/02* | (2009.01) |

(52) U.S. Cl.
CPC .......... *H04L 12/2854* (2013.01); *H04L 12/66* (2013.01); *H04L 41/0894* (2022.05); *H04L 41/145* (2013.01); *H04L 41/5032* (2013.01); *H04L 47/76* (2013.01); *H04L 49/70* (2013.01); *H04L 63/20* (2013.01); *H04L 67/12* (2013.01); *H04W 92/02* (2013.01); *G06F 2009/45595* (2013.01)

(58) Field of Classification Search
CPC ............... H04L 41/0895; H04L 41/145; H04L 41/5032; H04L 49/70; H04L 63/20; G06F 9/45558; G06F 2009/45595; G16Y 30/10; H04W 92/02
See application file for complete search history.

(56) References Cited

U.S. PATENT DOCUMENTS

| | | | |
|---|---|---|---|
| 10,212,088 B2 * | 2/2019 | LaBerge | H04L 47/125 |
| 10,397,043 B2 * | 8/2019 | Tapia | H04L 41/5074 |
| 10,411,951 B2 | 9/2019 | Clark | |
| 10,425,449 B2 | 9/2019 | Rudolph et al. | |
| 10,454,774 B2 | 10/2019 | Smith et al. | |
| 10,481,572 B2 | 11/2019 | Cella et al. | |
| 10,721,212 B2 * | 7/2020 | Chao | H04L 43/026 |
| 10,826,996 B2 | 11/2020 | Wood | |
| 2017/0041231 A1 | 2/2017 | Seed | |
| 2017/0288952 A1 | 10/2017 | Clark et al. | |
| 2018/0139104 A1 * | 5/2018 | Seddigh | H04L 41/12 |
| 2018/0176143 A1 | 6/2018 | Cui | |
| 2018/0270229 A1 * | 9/2018 | Zhang | H04L 63/102 |
| 2019/0138362 A1 * | 5/2019 | Ganapathi | H04L 67/566 |
| 2019/0158465 A1 | 5/2019 | Ahuja et al. | |
| 2019/0268973 A1 * | 8/2019 | Bull | H04W 92/02 |
| 2019/0288873 A1 * | 9/2019 | Camarillo Garvia | H04L 45/74 |
| 2019/0297103 A1 * | 9/2019 | Seshadri | H04L 63/20 |
| 2019/0319950 A1 * | 10/2019 | Bowling | H04L 63/029 |
| 2019/0387011 A1 | 12/2019 | Du | |
| 2020/0036603 A1 * | 1/2020 | Nieves | H04L 47/83 |

FOREIGN PATENT DOCUMENTS

| | | | | |
|---|---|---|---|---|
| CN | 109213456 A | | 1/2019 | |
| CN | 110417570 A | | 11/2019 | |
| WO | WO-2018063332 A1 * | | 4/2018 | H04L 41/0893 |
| WO | WO 2019/032728 A1 | | 2/2019 | |

OTHER PUBLICATIONS

Sood et al. English translation of TW 201643765 A. (Year: 2016).*
Saghezchi, Firooz B., et al. "Machine learning to automate network segregation for enhanced security in industry 4.0." Broadband Communications, Networks, and Systems: 9th International EAI Conference, Broadnets 2018, Faro, Portugal, Sep. 19-20, 2019.*
Cisco Identity Services Engine Data Sheet, Aug. 8, 2019, available at https://www.cisco.com/c/en/us/products/collateral/security/identity-services-engine/data_sheet_c78-656174.html.
Grady et al., White Paper "Removing the Complexities from Network Segmentation." © 2019 by The Enterprise Strategy Group, Inc.; Oct. 2019.
Cisco Validated Design, "SD-Access Segmentation Design Guide;" May 2018.
PCT Notification of Transmittal of the International Search Report and the Written Opinion of the International Searching Authority, or the Declaration, PCT/US2020/066587; mailed Apr. 13, 2021.
Office Action for Chinese Application No. 202080092135.9, dated Oct. 28, 2023, 9 Pages (not translated).
Office Action for European Application No. 20845474.4, dated Feb. 13, 2024, 8 Pages.
Office Action—Notice of Registration for Chinese Application No. 202080092135.9, dated Apr. 19, 2024, 08 Pages.
Wei Z., et al., "Building and Managing a Local Area Network Using a Virtual LAN", China Data Communications, No. 12, Dec. 2002, 17 Pages.

* cited by examiner

AUTOMATING A SOFTWARE-DEFINED WIDE AREA NETWORK POLICY FOR INTERNET OF THINGS END POINTS

RELATED APPLICATIONS

This application is a continuation of Application Serial No. 16/739,442 filed Jan. 10, 2020, entitled "Automating a Software-Defined Wide Area Network Policy for Internet of Things End Points."

TECHNICAL FIELD

This disclosure generally relates to the Internet of things (IoT), and more specifically to systems and methods for automating a software-defined wide area network (SD-WAN) policy for internet of things end points.

BACKGROUND

The evolution of the Internet has allowed for not only an ability to connect computers and communications devices, but also the ability to connect any smart "object" or "thing" in the physical world through a computer network. The term "Internet of Things" (IoT) refers to this interconnection of smart devices and their ability to transfer data over the network. The number of IoT devices is vastly increasing, and it is estimated that by the year 2021, IoT applications will represent more than fifty percent of all global devices and connections. Due to the rapid nature of this growth, along with the security issues that are inherent to the IoT, the management of IoT devices may prove difficult.

DESCRIPTION OF EXAMPLE EMBODIMENTS

Overview

Figure 1:
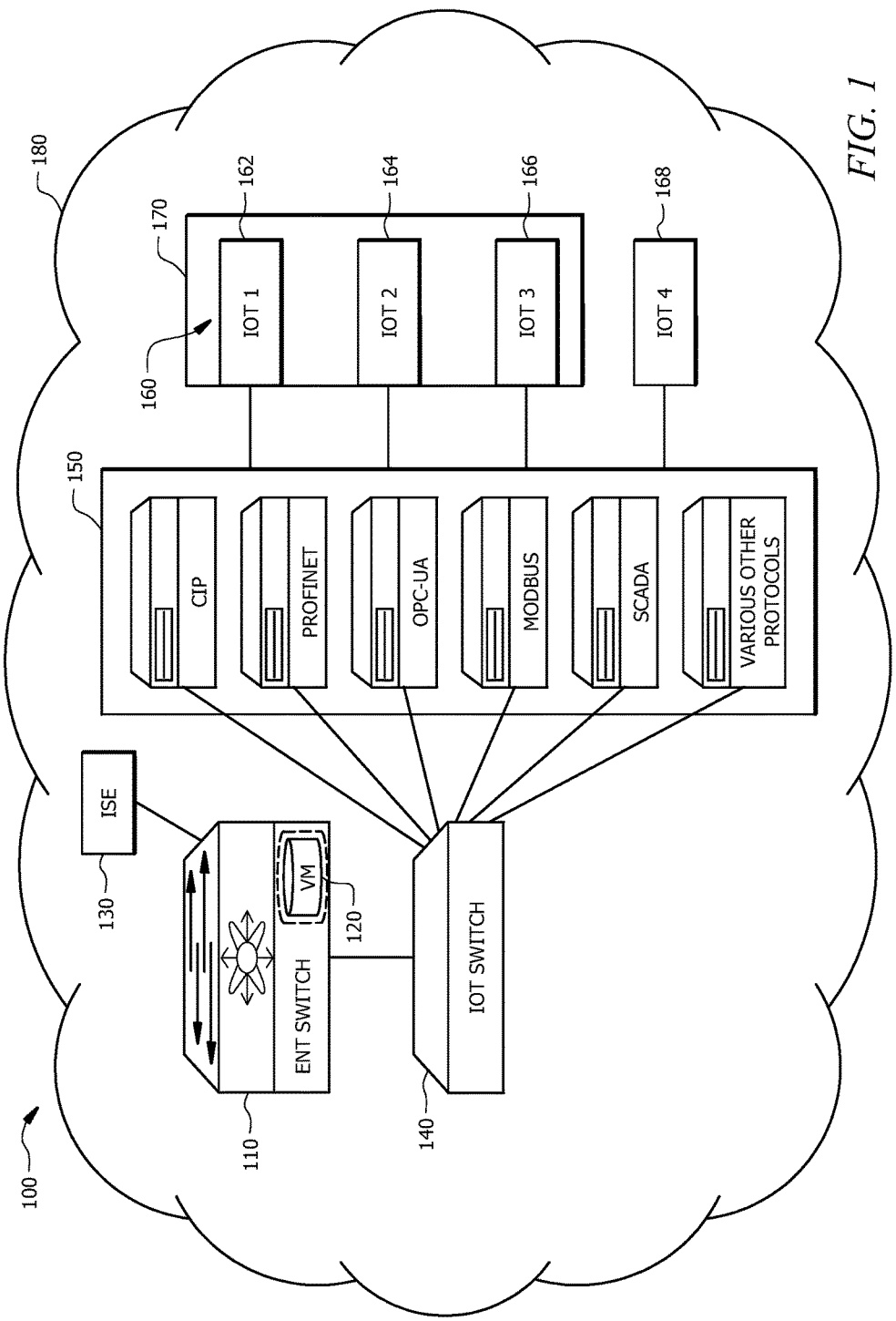
FIG. 1 illustrates an embodiment of a system for managing IoT end points, in accordance with the present disclosure.

According to an embodiment, an apparatus includes one or more processors and one or more computer-readable non-transitory storage media coupled to the one or more processors. The one or more computer-readable non-transitory storage media include instructions that, when executed by the one or more processors, cause one or more switches to perform operations including, identifying a first end point using a protocol associated with the first end point, determining a classification for the identified first end point based on one or more attributes of the first end point, identifying one or more related end points having the classification in common with the first end point, segmenting the first end point with the identified one or more related end points, and applying one or more policies to the segmented first end point and the one or more related end points. The one or more switches may include a virtual machine for identifying the first end point and/or the one or more related end points.

The operations may further include applying a policy to communicatively connect the first end point with the identified one or more related end points.

The operations may further include creating a secure network overlay for the first end point and the identified one or more related end points. Additionally, the operations may also include enforcing network policies on the first end point and across the secure network overlay. Further operations may include integrating the first end point and the identified one or more related end points in a software-defined wide area network (SD-WAN), as well as extending the one or more policies applied to the first end point and the one or more related end points across one or more clouds.

According to another embodiment, a method may include identifying, via one or more switches, a first end point using a protocol associated with the first end point, determining a classification for the identified first end point based on one or more attributes of the first end point, identifying, via one or more switches, one or more related end points having the classification in common with the first end point, segmenting the first end point with the identified one or more related end points, and applying one or more policies to the segmented first end point and the one or more related end points.

According to yet another embodiment, one or more computer-readable non-transitory storage media embody instructions that, when executed by a processor, cause one or more switches to perform operations including identifying a first end point using a protocol associated with the first end point, determining a classification for the identified first end point based on one or more attributes of the first end point, identifying one or more related end points having the classification in common with the first end point, segmenting the first end point with the identified one or more related end points, and applying one or more policies to the segmented first end point and the one or more related end points.

Technical advantages of certain embodiments of this disclosure may include one or more of the following. Certain embodiments of this disclosure may allow for dynamic identification, classification, segmentation and policy mapping of IoT end points, thereby enabling a secure and appropriate connection of IoT end points in a network. Additionally, other embodiments of this disclosure may allow for the following advantages: the autocreation of secure IoT end point specific overlays; the enforcement of network policies for IoT end points; the prevention of rogue IoT end points from joining network overlays; the provision of box telemetry, including bandwidth reservation on network overlays; the provision of deep telemetry for IoT end points to enable detection and analysis of IoT end point failure on the cloud; and the provision of IoT end point to IoT end point connectivity to enable deep learning of IoT end points and assist in automatic troubleshooting.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

The Internet-of-Things (IoT) is a system of interrelated smart devices having the ability to transfer data across a network infrastructure to integrate the physical world into computer-based systems using communications protocols. Almost any physical object may be transformed into an IoT device if it can be connected to and controlled through the internet. In the consumer context, lightbulbs, appliances, thermostats, home security systems, televisions, and even toys may be integrated through a network. In the commercial context, the term "Industrial IoT" refers to interconnected sensors, instruments, machinery, and other devices networked together in commercial, healthcare, industrial, or other such applications. The term IoT may be used throughout this disclosure to generally refer to consumer and/or industrial IoT applications.

Generally, IoT devices may consist of a lightweight and dedicated operating system having low memory, CPU, and power overhead requirements. When possible, IoT devices may also be designed to provide wireless connectivity. These specifications may necessarily result in low security and high vulnerability. In other words, when previously standalone or network-inert IoT devices are brought into a network, with no automatic means of identifying, policy-assigning, monitoring, managing, patching, or upgrading, the possibility of system compromise (i.e., the risk of hackers discovering and attacking these devices) is high. This may be particularly problematic where IoT devices attempt to connect to a network through an external switch. As conventional switches do not support IoT protocols, they cannot identify or directly communicate with IoT devices, and further lack the functionality to safely interconnect IoT devices with appropriate end points in the network. As a result, enterprises may be forced to simply isolate IoT devices and/or a user may be required to manually create policies for each IoT device.

There are various disadvantages with the conventional systems described above. For example, manually creating policies for each of a growing plurality of IoT devices presents numerous inefficiencies in time and resources. Additionally, the isolation of IoT devices limits the flexibility and the value of an interconnected network, (i.e., there are benefits to allowing IoT devices to connect with appropriate areas of the network.) Thus, there is a need for a system that allows for integration, while maintaining security.

Reference is now made to FIG. 1, wherein is shown a system 100 for dynamically identifying and applying policies for IoT end points. System 100 may comprise an enterprise switch 110 (which may include a virtual machine 120), an identity services engine (ISE) 130, an IoT switch 140, and IoT endpoints 160 associated with protocols 150, all associated with network 180. A plurality of IoT end points are labeled collectively as 160, and individually as 162, 164, 166, and 168. The system 100 may comprise any number of IoT end points 160, and any number of protocols 150 associated with the end points 160.

Figure 2:
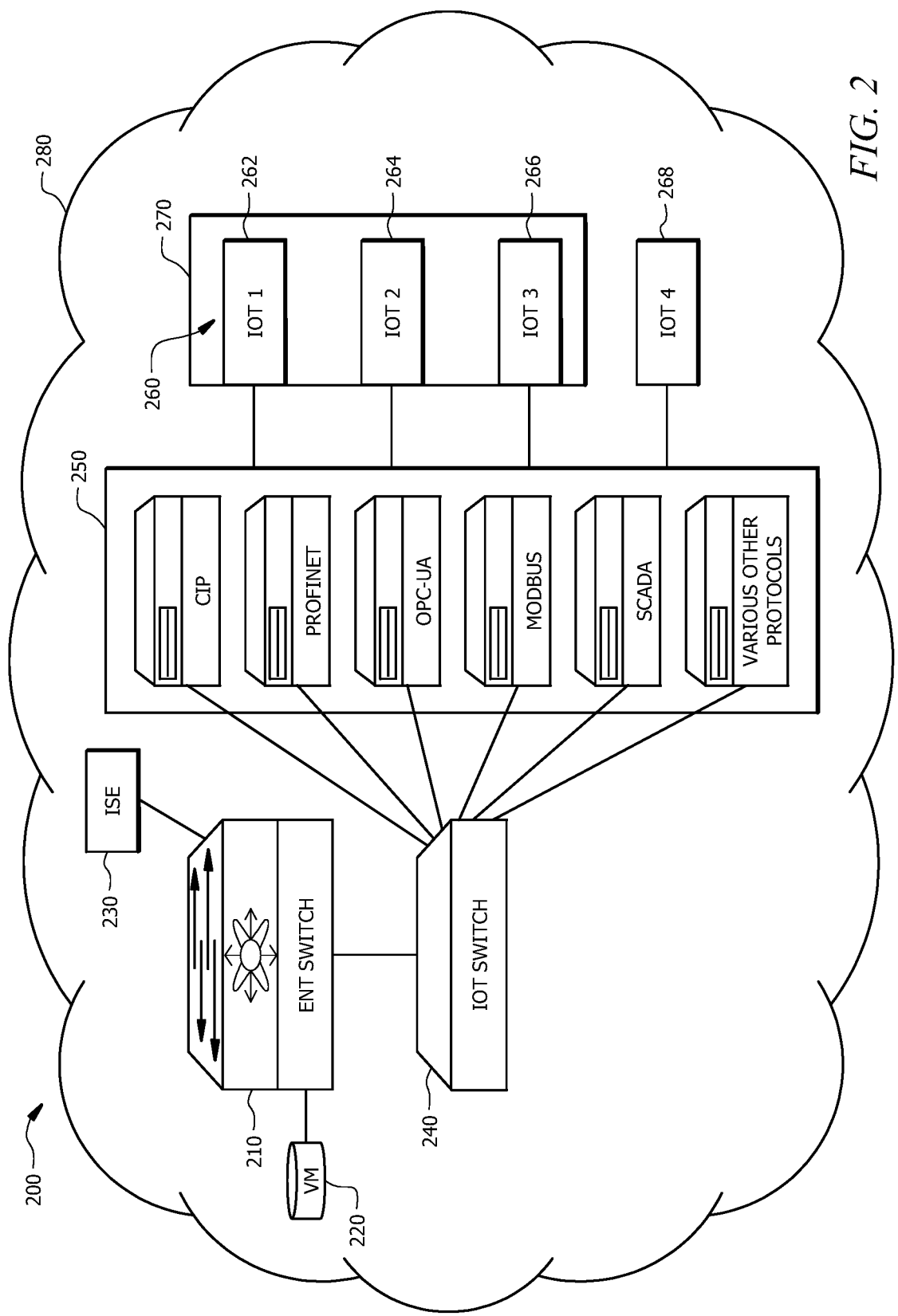
FIG. 2 illustrates another embodiment of a system for managing IoT end points, in accordance with the present disclosure.

Enterprise switch 110 may be a high-performance, high-density switch that is programmable and allows for software-defined networking. In some embodiments, enterprise switch 110 may include a virtual machine 120 that provides the enterprise switch 110 with intelligence capability to identify an IoT end point 160. It is to be understood that element 120 is not limited to an actual virtual machine, but may comprise a processor, module, or other component (including the components described in FIG. 5, as applicable), whether physical or virtual, having the ability to identify end points in a network. Additionally, virtual machine 120 may be incorporated as a functionality within the enterprise switch 110 (as shown in FIG. 1), or the virtual machine 220 may be hosted outside the switch 210 and may be communicatively coupled to the enterprise switch 210 (as shown in FIG. 2). Hosting the virtual machine 220 outside the enterprise switch 210 (as shown in FIG. 2) will not impact the functionality, or the overall spirit and scope of the system 100 described in FIG. 1. In other words, it is to be understood that the description of FIG. 1, as set forth below, applies to the system 200 shown in FIG. 2. With reference to FIG. 1, enterprise switch 110 may further be communicatively coupled to an ISE 130, a network administration product that may enable the creation and enforcement of security and access policies for end points 160 connected to an enterprise's routers and switches.

According to the present disclosure, when a particular IoT end point (e.g., IoT end point 162 shown in FIG. 1) connects to the network 180 for the first time, the enterprise switch 110 may detect and identify the IoT end point 162 as an IoT device by implementing one or more protocols associated with the IoT end point 162. Enterprise switch 110 may support a plurality of protocols, including IoT protocols such as, by way of example, CIP, PROFINET, OPC-UA, Modbus, BACnet, SCADA, etc. It is to be understood that the protocols listed in the present disclosure are provided by way of example, and that enterprise switch 110 may support any other protocols known or developed in the art, including custom and/or proprietary protocols. In other embodiments, the enterprise switch 110 may utilize the virtual machine 120 to identify the IoT end point 262.

Once the enterprise switch 110, whether itself or through the virtual machine 120, identifies the IoT end point 162 as an IoT device, it may then discover one or more attributes associated with the IoT end point 162. Attributes may comprise identifiers associated with IoT end points 160 and may include, but are not limited to, information relating to the asset ID, device type, Mac address, Internet Protocol (IP) address, Product ID, Protocol, Vendor ID, and the like. Attributes may also include the type of data transmitted by the IoT end points. The enterprise switch 110 may then classify the IoT end point 162 based on its attributes. For example, based on its Vendor ID, the switch may classify the IoT end point 162 as a security camera, as opposed to, e.g., a video conferencing camera. An IoT end point 162 may be classified based on a single attribute (e.g., Vendor ID), or may be classified based on multiple attributes (e.g., Vendor ID and type of data transmitted). The classification may assist the switch in determining the appropriate destination(s) of such data in the network, as well the appropriate restrictions that should be placed on the IoT end point 162 (including that devices it can communicate to and receive communications from). Thus, the "security camera" classification may ensure that data from the IoT end point 162 is not communicated with or among, for example, video conferencing cameras or other such devices which have no need to interact or are restricted from interacting with security camera data.

In some embodiments, ISE 130 may be used in connection with the enterprise switch 110 and/or the virtual machine 120 to classify the IoT end point 162 and the data transmitted from the end point 162 to assist in the determination of network access. ISE 130 may also apply one or more policies to the IoT end point 162, as well as any organizational security requirements that may apply to that classification. Policies may relate to connectivity (e.g., whether the system will allow connectivity for the IoT devices trying to connect to and use network resources), communication (e.g., whether the system will allow a particular IoT end point to communicate with or access particular IoT gateways, clouds, or other areas of a network), or other such rules relevant to the integration of an IoT end point within a network.

Using the classification of the IoT end point 162, the enterprise switch 110 (alone or in conjunction with the virtual machine 120) may then identify related IoT end points 164, 166 in the network 180 having the classification in common with the IoT end point 162. In an embodiment, the enterprise switch 110 (alone or in conjunction with the virtual machine 120) may use one or more of the attributes and/or the classification of the IoT end point 162 to identify the related IoT end points 164, 166 in the network. If the enterprise switch 110 and/or the virtual machine 120 is able to identify related IoT endpoints 164, 166 having one or more attributes and/or the classification in common with the IoT end point 162, the enterprise switch 110 may separate the IoT endpoint 162 and the identified related IoT end points 164, 166 into a segment 170. This process, called segmentation, is the splitting of a computer network into smaller network segments, wherein end points assigned to a given (first) segment may communicate with one another, while end points assigned to a separate (second) segment may be restricted from communicating with elements in the first segment. The enterprise switch 110 may apply any additional policies relating to IoT end points 164, 166 to IoT end point 162, or if applicable, apply a new policy to all of the segmented IoT end points in the segment 170.

Additionally, once a group of IoT end points 162, 164, 166 are segmented, the switch 110 may also identify non-IoT devices (e.g., processors, analytics equipment, etc.) which may need to communicate and/or are authorized to communicate with the segmented IoT end points 162, 164, 166 and then communicatively connect those non-IoT devices with the segmented non-IoT end points 162, 164, 166.

To further illustrate how the process of identifying related IoT end points based on attributes and/or classifications may occur in practice, consider the following example of IoT end points in the field of agriculture. Agricultural IoT end points may be employed to measure and transmit data relating to soil condition in a rice field. For example, an IoT end point may be coupled with a sensor to measure nitrogen content in the soil; another IoT sensor may be utilized to measure water content; and yet another IoT sensor may be utilized to measure ammonia content. All of these IoT end points may have been manufactured and/or distributed by the same third-party vendor. Likewise, all of these end points may be transmitting the same type of data (i.e., information relating to the content of various elements in soil). When one or more of these IoT end points connect to the enterprise switch in a network, the switch may first identify each IoT end point based on its associated IoT protocol. Then, the switch may determine one or more attributes associated with each IoT end point. For example, for the IoT end point measuring water content, the switch may recognize (based on the vendor ID) that the IoT end point is manufactured by the particular third-party agricultural vendor. Additionally, the switch may recognize, based on the type of data the end point is transmitting, that the end point is a sensor that measures water content. Based on one or more of these attributes, the switch may then classify the IoT end point as an agricultural sensor. Once the switch recognizes that a group of end points share a common classification, i.e., that they share one or more attributes in common, it may segment related end points and apply one or more policies to the group of end points so that they may communicate and/or share data with each other.

Once the IoT endpoint 162 has been segmented with related IoT end points 164, 166, the enterprise switch 110 may create a secure network overlay for the segmented IoT end points 162, 164, 166, and may enforce applicable network policies on the IoT end points 162, 164, 166 across the secure network overlay. In other words, end points 162, 164, 166 of the same/similar type (e.g., devices having the same attributes and/or classification) may be connected and may securely communicate with one another on the secure network overlay. In an enterprise, secure network overlays may be established on a "per-department" basis so that end points in separate departments may be restricted from communicating, accessing, or transmitting data with one another. Additionally, all of the policies applied to the IoT end point 162, as well as to the related IoT end points 164, 166, may be extended across one or more clouds.

Importantly, the functionality herein described in connection with the enterprise switch 110 is not merely for purposes of ad hoc identification of IoT devices 160 in the network 180, but rather for purposes of monitoring the IoT end points 160 and their activity in the network 180. In other words, IoT end points 160 may be consistently monitored to determine whether and what data is being transmitted so that network anomalies may be quickly identified and addressed.

In some embodiments, the system 100, including IoT endpoints 160 may further be integrated with a software-defined wide area network (SD-WAN) and a management platform may derive dynamic policy mapping for IoT end points 160. With dynamic policy mapping, existing (and growing) data relating to the universe of IoT devices may used to dynamically classify and identify new end points and, based on these classifications, dynamically apply policies to such end points. The management platform, such as Cisco's vManage platform, may create an application service level agreement (SLA) policy for each IoT end point 162, 164, 166, 168 and ensure that there is consistent network SLA maintained for segmented IoT end points 162, 164, 166 to communicate with each other over a secure overlay. For example, switch 110 may collect data from multiple IoT end points across multiple sites (for example, video camera data may be collected from sites in San Jose, San Francisco, and Palo Alto) and may communicate such data to the management platform. The management platform may recognize that multiple sites are relaying the same attribute and may dynamically create and manage a network of the sites, so that each end point may communicate with the other end points in a secure overlay.

Figure 3:
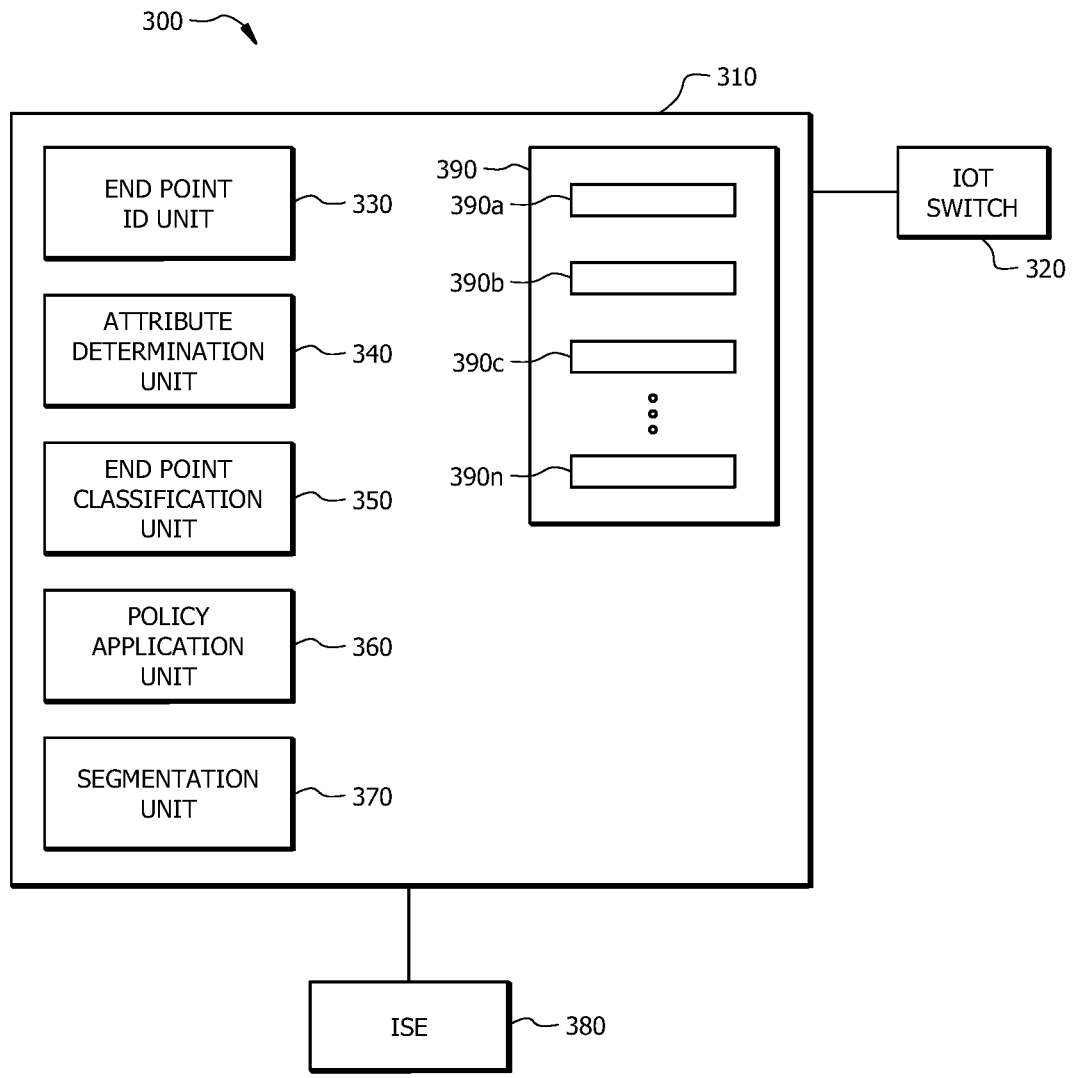
FIG. 3 illustrates a block diagram of a system for managing IoT endpoints, in accordance with the present disclosure.

Reference is now made to FIG. 3, wherein is shown a block diagram 300 of an enterprise switch 310 (corresponding to enterprise switch 110 in FIGS. 1 and 210 in FIG. 2). The enterprise switch 310 may include, for example, an endpoint identification unit 330, an attribution determination unit 340, an endpoint classification unit 350, a policy application unit 360, and a segmentation unit 370. It is to be understood that one or more of the foregoing components of the enterprise switch 310 may correspond to the functionality of a virtual machine (not shown). Alternatively, as discussed above in conjunction with FIGS. 1 and 2, the virtual machine and/or its corresponding functionality may be hosted outside, but communicably coupled to, the enterprise switch 310. Additionally, it is to be understood that one or more of the components of enterprise switch 310 may communicate with one another, with the IoT switch 320, with ISE 380, and/or with any other components, units, and/or modules in the system in which the enterprise switch 310 is employed.

With continued reference to FIG. 3, the enterprise switch 310 may be communicatively coupled to an IoT switch 320 (through which it receives information about IoT end points that have entered the network) and ISE 380 (which may be used in connection with the enterprise switch 310 and/or the functionality of the virtual machine (not shown) to classify the IoT end points, as discussed above).

The endpoint identification unit 330 may identify an IoT endpoint that has entered the network by using a protocol 390a, from a plurality of stored protocols 390, associated with the IoT end point. Enterprise switch 310 may support of a plurality of protocols, including, by way of example, CIP, PROFINET, OPC-UA, Modbus, BACnet, SCADA, as well as any custom or proprietary protocols existing or developed in the art. The attribute determination unit 340 may determine one or more attributes associated with the IoT end point identified by the end point identification unit 330. Attributes may include identifiers such as, by way of example, asset ID, device type, Mac address, IP address, Product ID, Protocol, Vendor ID, type of data transmitted, and the like.

With continued reference to FIG. 3, the endpoint classification unit 350 may classify the IoT end point based on the attributes determined by the attribution determination unit 340. In some embodiments, the enterprise switch 310 may publish the attributes determined by the attribute determination unit 340 to ISE 380. ISE 380 may use the attribute information provided by the attribution determination unit 340 to classify and/or profile the IoT end point.

In certain embodiments, ISE 380 may use one or more of the attributes and/or the classification of the IoT end point to apply one or more policies to the IoT end point, as well as any organizational security requirements that may apply to the classification. In other embodiments, ISE 380 may communicate profile information back to the enterprise switch 310, and the policy application unit 360 may apply one or policies to the IoT end point. In still further embodiments, the enterprise switch 310 may itself profile the IoT end point and apply one or policies to the IoT end point.

The segmentation unit 370 may identify one or more related IoT end points in the network having the same classification and/or attributes as the identified IoT end point and initiate segmentation of the identified IoT end point with the related IoT end points. The policy application unit 360 may apply any policies associated with the related IoT end points to the identified IoT end point, or if applicable, apply a new policy to all of the IoT end points in a given segment.

According to an embodiment, enterprise switch 310 may comprise a high-density switch built on software-defined access (SDA) technology. Unlike conventional switches, the enterprise switch 310 with SDA framework may provide capabilities such as automated end-to-end segmentation, analytics, automated user and device policy across the wired and wireless network via a single network fabric.

Additionally, enterprise switch 310 may include various functionality relating to the management of the IoT devices which are not shown in FIG. 3. For example, enterprise switch 310 may auto-create secure IoT end-point-specific overlays; may enforce network policies for IoT end points, including which end point can communicate with which other end point(s) and when; may prevent rogue IoT devices joining the network overlays; may provide box telemetry, including bandwidth reservation for IoT end points; may provide deep telemetry for IoT end points in the cloud so that any end point failure may be analyzed in the cloud; and may enable deep learning of IoT end points to assist IoT devices in automatic troubleshooting.

Figure 4:
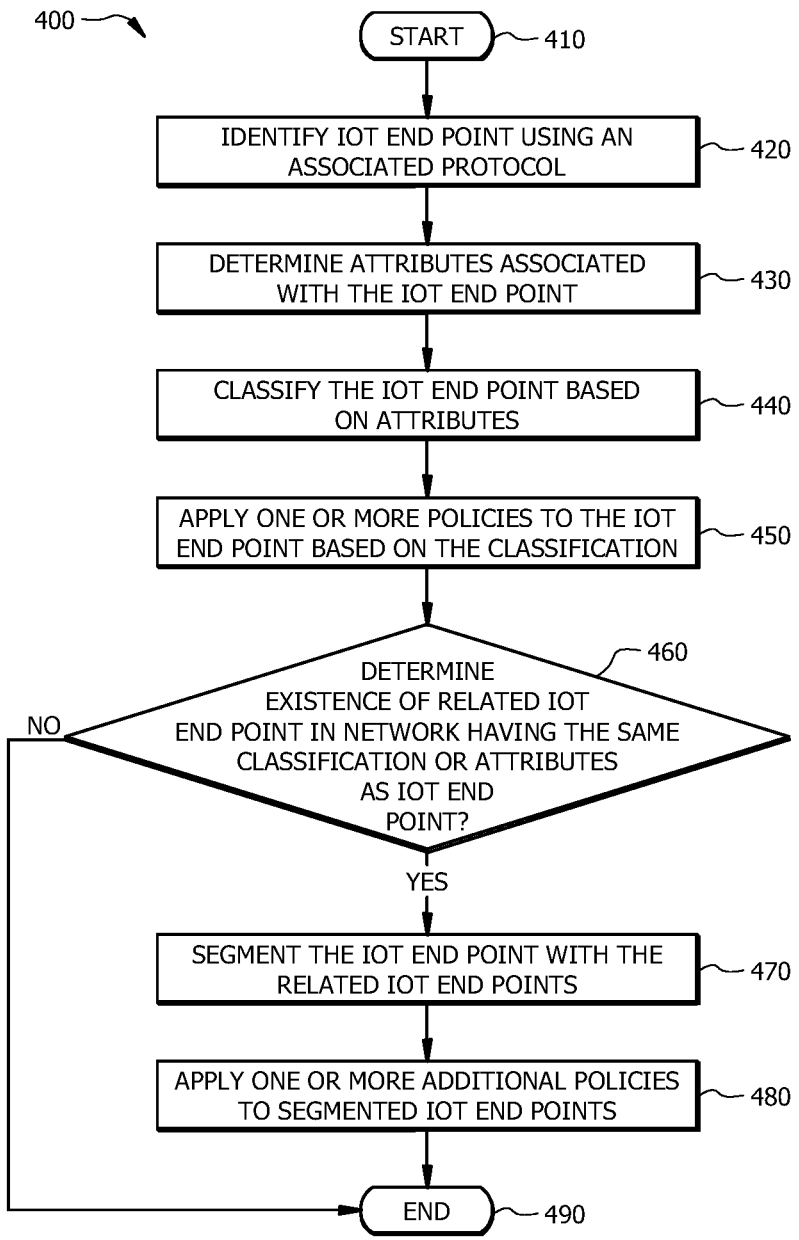
FIG. 4 illustrates a method for managing IoT end points, in accordance with the present disclosure.

Reference is now made to FIG. 4, wherein is shown a method 400 for identifying and applying policies for IoT end points, in accordance with the present disclosure. At step 410, the method may begin. At step 420, an enterprise switch may identify an IoT end point using one or more protocols associated with the IoT end point. Protocols supported by the enterprise switch may include, by way of example, CIP, PROFINET, OPC-UA, Modbus, BACnet, SCADA, etc. Protocols may also include custom or proprietary protocols known or later developed in the art. At step 430, the enterprise switch may determine one or more attributes associated with the identified IoT end point. Attributes associated with IoT end points may include information relating to the asset ID, device type, Mac address, IP address, Product ID, Protocol, Vendor ID, type of data transmitted, and the like. At step 440, the enterprise switch may classify the IoT end point based on the determined attributes. In some embodiments, the enterprise switch may classify the IoT end point. In other embodiments, the enterprise switch may initiate ISE to complete the classification. At step 450, one or more policies may be applied to the IoT end point based on the classification of the IoT end point.

At step 460, a determination is made as to whether there are any additional and/or related IoT endpoints in the network having the same classification and/or attributes as the IoT end point identified in step 420. If no related IoT end points are identified in the network, the method may end at step 490. If, however, one or more related IoT end points having the same classification and/or attributes as the IoT end point identified in step 420 are found in the network, the method may proceed to step 470, wherein the enterprise switch may segment the IoT end point identified in step 420 with the related IoT end points in the network. At step 480, the enterprise switch may apply one or more policies to one or more IoT endpoints in the segmented group. At step 490, the method may end.

The method of FIG. 4 may further include the steps (not shown) of identifying and communicatively coupling authorized non-IoT devices with the segmented IoT end points, creating a secure network overlay for the IoT end point identified in step 420 and the related IoT end points segmented in step 470; enforcing network policies on the segmented IoT end points across the secure network overlay; integrating the segmented IoT end points in a SD-WAN; and extending the policies applied to the segmented IoT end points across one or more clouds.

The systems described in FIGS. 1-3 and the method described in FIG. 4 may be used to apply policies customized for different types of end points in a network. For example, in certain embodiments, the enterprise switch disclosed in the present disclosure may be used to communicate traffic to/from IoT end points within a network, such as an enterprise network or an SD-WAN. Examples of end points may include security cameras, video conference cameras, door access equipment (e.g., badge readers, finger print scanners, etc.), building management systems (e.g., controllers for air conditioners, light switches, etc.), credit card scanners, printers, medical equipment (e.g., x-ray machines), refrigerators, washing machines, music players, and/or other types of devices. The IoT end points may be deployed in any suitable environment, such as a business enterprise, retail store, hospital, university, airport, home, etc., depending on the type of end point.

When a new end point is plugged into the network, the switch may classify the end point based on its attributes. As an example, when a user plugs in a new end point such as a security camera, the switch may use an asset ID, device type, MAC address (which may indicate the manufacturer of the camera), Internet Protocol (IP) address, Product ID, Protocol, Vendor ID, type of data transmitted, and/or other attributes to classify the new end point as a security camera (rather than, for example, a video conference camera or other type of end point). The switch may then segment the security camera with a security camera segment. The switch may determine one or more policies that apply to the security camera segment and may automatically apply those policies to the new security camera. In an embodiment, a policy may indicate which end points can communicate with the security camera. For example, the policy may allow the security camera to communicate with other security-related end points (such as a security guard's workstation), but may prevent the security camera from communicating with end points unrelated to security (such as refrigerators or a marketing employee's workstation). In another embodiment, a policy may indicate how much bandwidth the security camera is permitted to use under various network conditions. In another embodiment, a policy may indicate the types of telemetry data which may be collected from the security camera and/or when or how often to collect certain types of telemetry data.

By segmenting the end points based on attributes, policies can be periodically updated and pushed to each of the end points having a given attribute. In one embodiment, the switch may identify an end point when the end point is initially plugged into a port. The switch may then associate the corresponding port with a segment for that type of end point and may periodically push segment-specific policies to the port. The switch may disassociate the port from the segment in response to detecting that the end point has been unplugged from the port.

As an example of policy updates, a company may desire to push a policy to its badge readers to prevent building access after business hours. The company may later decide to update the policy so that individuals with certain badges (e.g., employee badges) may access the building after business hours, but individuals with other badges (e.g., contractor badges) may only access the building during business hours. The company may update the policy accordingly and may push the new policy to the badge reader segment in order to provide all of the badge readers with the updated policy. As another example, the company may push a policy with new badge numbers to the badge readers when new employees are hired.

Segmentation based on the attributes of end points can be used to create a separation of different types of end points accessing the same underlying network resources. This may provide control over which users may access an end point, which end points may communicate with each other, how much bandwidth an end point may consume, how much bandwidth to reserve for an end point under various network conditions, etc. For example, a hospital which defines a segment for medical equipment used in surgical procedures and a segment for entertainment equipment used in the waiting room may apply policies to the segments to ensure that the medical equipment segment can reserve sufficient bandwidth and to prevent the entertainment equipment from using the bandwidth required by the medical equipment segment.

Segmentation may also be used to collect and monitor telemetry data per segment. For example, while telemetry data may be collected from a plurality of end points (some of which may be related and some of which may be unrelated), the system may evaluate telemetry data associated with a particular segment with related end points, such as a security camera segment, to determine insights as to how many security cameras are on the network, where they are located, and the performance of the security cameras. Using the telemetry data from a particular segment may allow the system to determine when a policy update or other change would be beneficial. As an example, if one security camera is generating unusual telemetry data compared to other security cameras in the segment (e.g., too much data, too little data, anomalous/unexpected data), that may be an indication that the security camera needs to be repaired or replaced. Telemetry data may also be used for network planning, for example, to determine when to increase network resources. In one embodiment, telemetry data may indicate when the switch is running out of capacity and should be replaced with a higher capacity switch.

In certain embodiments, the switch described in the present disclosure may be further operable to detect rogue devices. As an example, a policy may indicate that a company only uses certain types of cameras for security. In the event that the switch detects a camera with one or more attributes that fail to match the attributes of authorized security cameras (such as MAC address, Product ID, Vendor, and/or other attribute(s)), the switch may identify the camera as a rogue device and prevent the camera from joining the security camera segment. In an embodiment, the switch may send a notification to a system administrator that the rogue device has been detected. It is to be understood that the foregoing examples are provided for purposes of illustration only, and that the present disclosure contemplates a host of applications stemming from and/or relating to the automatic segmentation and application of policies to IoT end points as described herein.

Figure 5:
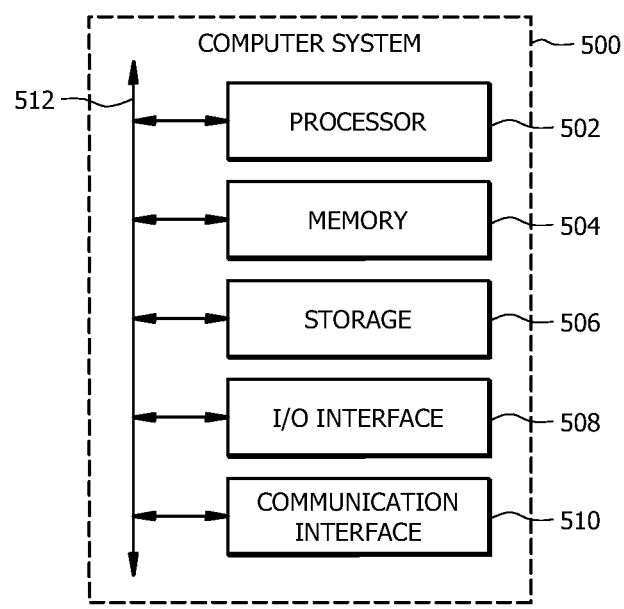
FIG. 5 illustrates a computer system that may be used by the systems and methods described herein, in accordance with the present disclosure.

Reference is now made to FIG. 5, wherein is shown an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), a SD-WAN, or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A system, comprising:
one or more processors; and
one or more computer-readable non-transitory storage media coupled to the one or more processors and comprising instructions that, when executed by the one or more processors, cause one or more switches of the system to perform operations comprising:
identifying a first end point using a protocol associated with the first end point;
determining a classification for the identified first end point based on one or more attributes of the first end point;
identifying one or more related end points having the classification in common with the first end point;
segmenting the first end point with the identified one or more related end points;
collecting telemetry data from the segmented first end point and the one or more related end points;
determining, using a deep learning model and the collected telemetry data from a particular segment associated with the segmented first end point and the one or more related end points, a segment-specific policy update to assist the segmented first end point and the one or more related end points in automatic troubleshooting, and
applying the policy update to the segmented first end point and the one or more related end points.

2. The system of claim 1, the operations further comprising:
allocating one or more network resources based on the collected telemetry data.

3. The system of claim 1, wherein the one or more switches comprise a virtual machine, and wherein the virtual machine is operable to perform the operations comprising identifying the first end point using the protocol associated with the first end point and identifying the one or more related end points having the classification in common with the first end point.

4. The system of claim 1, the operations further comprising:
creating a secure network overlay for the first end point and the identified one or more related end points.

5. The system of claim 4, the operations further comprising:
enforcing network policies on the first end point and across the secure network overlay.

6. The system of claim 1, the operations further comprising:
integrating the first end point and the identified one or more related end points in a software-defined wide area network (SD-WAN).

7. A method, comprising:
identifying, via one or more switches, a first end point using a protocol associated with the first end point;
determining a classification for the identified first end point based on one or more attributes of the first end point;
identifying, via one or more switches, one or more related end points having the classification in common with the first end point;
segmenting the first end point with the identified one or more related end points;
collecting telemetry data from the segmented first end point and the one or more related end points;
determining, using a deep learning model and the collected telemetry data from a particular segment associated with the segmented first end point and the one or more related end points, a segment-specific policy update to assist the segmented first end point and the one or more related end points in automatic troubleshooting; and
applying the policy update to the segmented first end point and the one or more related end points.

8. The method of claim 7, further comprising:
allocating one or more network resources based on the collected telemetry data.

9. The method of claim 7, wherein the one or more switches comprise a virtual machine, and wherein the virtual machine is operable to identify the first end point using the protocol associated with the first end point and identify the one or more related end points having the classification in common with the first end point.

10. The method of claim 7, further comprising:
creating a secure network overlay for the first end point and the identified one or more related end points.

11. The method of claim 10, further comprising:
enforcing network policies on the first end point and across the secure network overlay.

12. The method of claim 7, further comprising:
integrating the first end point and the identified one or more related end points in a software-defined wide area network (SD-WAN).

13. One or more computer-readable non-transitory storage media embodying instructions that, when executed by a processor, cause one or more switches to perform operations comprising:
identifying a first end point using a protocol associated with the first end point;
determining a classification for the identified first end point based on one or more attributes of the first end point;
identifying one or more related end points having the classification in common with the first end point;
segmenting the first end point with the identified one or more related end points;
collecting telemetry data from the segmented first end point and the one or more related end points;
determining, using a deep learning model and the collected telemetry data from a particular segment associated with the segmented first end point and the one or more related end points, a segment-specific policy update to assist the segmented first end point and the one or more related end points in automatic troubleshooting, and
applying the policy update to the segmented first end point and the one or more related end points.

14. The one or more computer-readable non-transitory storage media of claim 13, the operations further comprising:
determining a policy update for the segmented first end point and the one or more related end points, wherein the policy update is based on the collected telemetry data; and
applying the policy update to the segmented first end point and the one or more related end points.

15. The one or more computer-readable non-transitory storage media of claim 13, the operations further comprising:
allocating one or more network resources based on the collected telemetry data.

16. The one or more computer-readable non-transitory storage media of claim 13, the operations further comprising:
   creating a secure network overlay for the first end point and the identified one or more related end points.

17. The one or more computer-readable non-transitory storage media of claim 16, the operations further comprising:
   enforcing network policies on the first end point and across the secure network overlay.

18. The one or more computer-readable non-transitory storage media of claim 13, the operations further comprising:
   integrating the first end point and the identified one or more related end points in a software-defined wide area network (SD-WAN).

\* \* \* \* \*